C. T. ADCOX & D. A. HEADRICK.
STOP FOR CONVEYERS.
APPLICATION FILED JUNE 1, 1909.
953,572.
Patented Mar. 29, 1910.
2 SHEETS—SHEET 2.
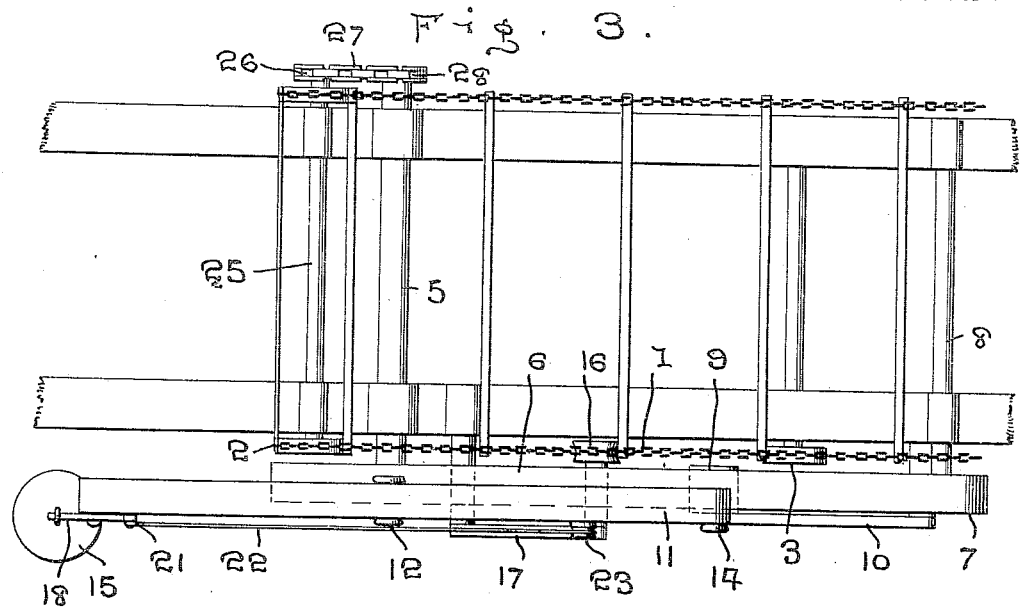
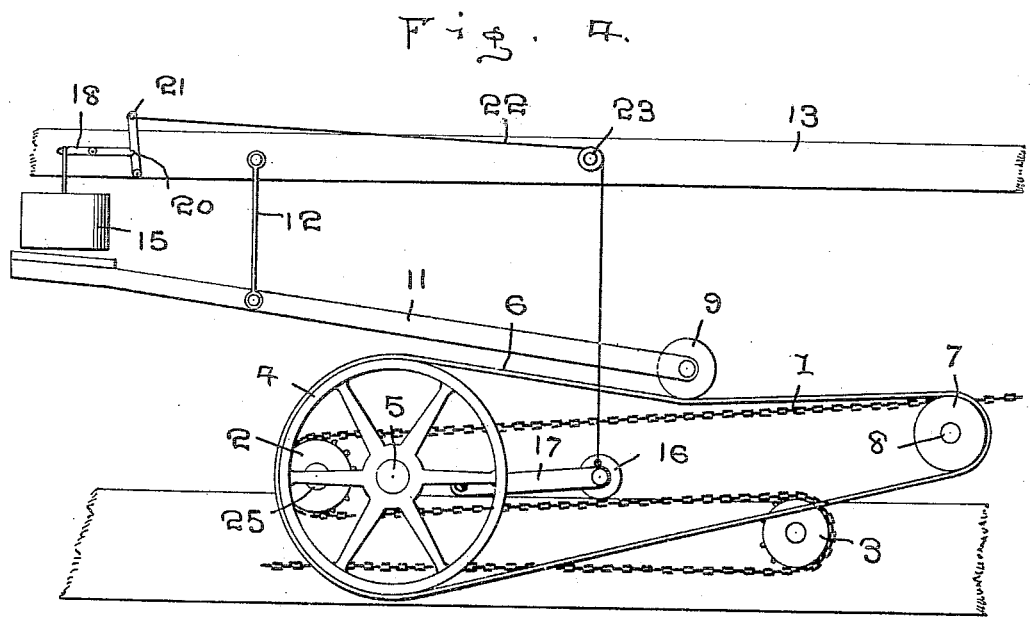
WITNESSES:
Thos. W. Riley
H. J. Jacobi.
INVENTORS
C. T. Adcox
D. A. Headrick
BY
W. T. FitzGerald & Co.
Attorneys

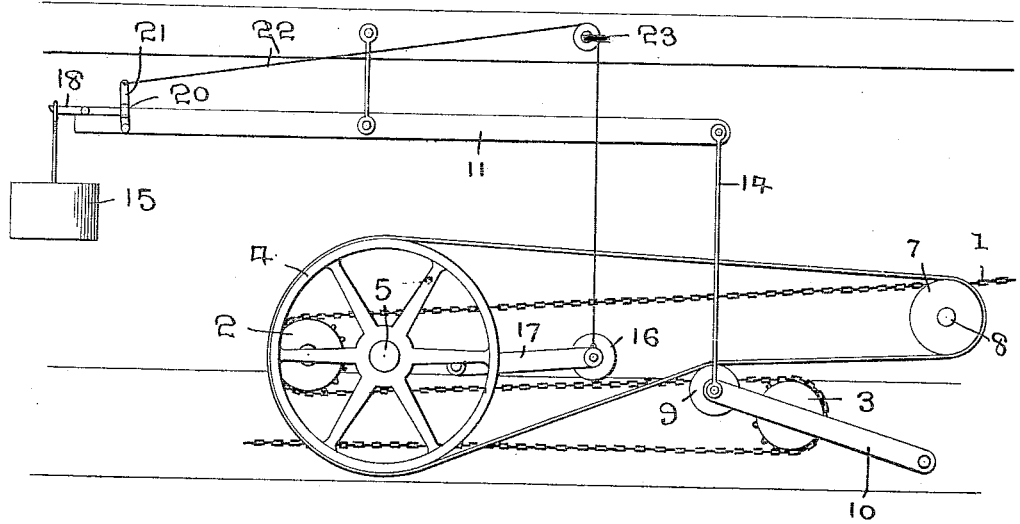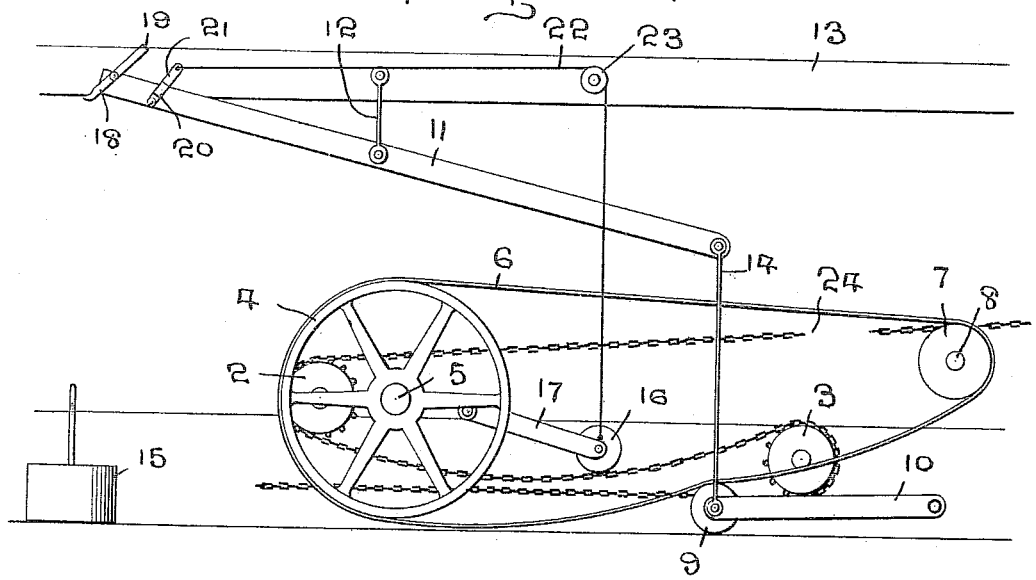

UNITED STATES PATENT OFFICE.

CLAYTON T. ADCOX AND DANIEL A. HEADRICK, OF RANDOLPH, LOUISIANA.

STOP FOR CONVEYERS.

953,572.

Specification of Letters Patent.

Patented Mar. 29, 1910.

Application filed June 1, 1909. Serial No. 499,352.

*To all whom it may concern:*

Be it known that we, CLAYTON T. ADCOX and DANIEL A. HEADRICK, citizens of the United States, residing at Randolph, in the parish of Union and State of Louisiana, have invented certain new and useful Improvements in Stops for Conveyers; and we do hereby declare the following to be a full, clear, and exact description of the invention, such as will enable others skilled in the art to which it appertains to make and use the same.

Our invention relates to new and useful improvements in stops for conveyers and more particularly to that class employed for conveying articles from one point to another and our object is to provide means for stopping the conveyer operating mechanism should said conveyer become broken.

Other objects and advantages will be hereinafter referred to and more particularly pointed out in the claims.

In the accompanying drawings forming part of this application, Figure 1 is a side elevation of parts of a conveyer showing our improved stopping mechanism applied thereto, the conveyer being in operative position, Fig. 2 is a similar view showing the stopping mechanism in operation. Fig. 3 is a top plan view of the device, and, Fig. 4 is an elevation of a slightly modified form of means for stopping the driving mechanism.

Referring to the drawings in which similar reference numerals designate corresponding parts throughout the several views, 1 indicates the conveyer, which in this instance is a chain conveyer, said chain extending around a sprocket 2 and also around an idler sprocket 3, which idler is adapted to hold the chain taut.

The sprocket 2 is positively driven from a pulley 4, which is rotatably mounted upon a shaft 5, power being applied to said pulley through the medium of a belt 6, which belt extends around a driving pulley 7 on the end of a line shaft 8, said line shaft being connected direct to the source of power.

The belt is loosely mounted on the pulleys 4 and 7 thereby requiring an idler 9 to hold the belt taut and cause the same to drive the pulley 4, said idler being mounted between pivotally mounted standards 10 and when the idler is swung upwardly, the belt will be held sufficiently taut to drive the pulley 4 when the pulley 7 is rotated.

The idler 9 is held in its elevated position by means of a rocking bar 11, which is pivotally engaged by the hanger 12, adjacent its longitudinal center, the upper end of the hanger being attached to any suitable form of beam 13, one end of the bar 11 being attached to the standards 10 by means of a rod 14, while the opposite end thereof is to be engaged by a weight 15, said weight being of such size as to hold the idler in its elevated position and against the belt with sufficient force to hold the belt taut.

The trouble heretofore encountered in devices of this class is that when the conveyer becomes broken, the driving mechanism continues running and deposits the conveyer below the driving mechanism, thereby requiring considerable time and labor in releasing and restoring the conveyer to its proper position and to overcome this objectionable feature, we provide means for instantly stopping the conveyer driving mechanism the instant the conveyer becomes broken or loosened, so that it will sag, which means consists of a bearing roller 16, which is attached to a swinging arm 17 carried by parts of the supporting frame for the driving mechanism, said roller being adapted to rest on parts of the conveyer and be supported thereby, whereby when the conveyer becomes loosened, sufficiently to sag, the roller will descend.

The weight 15 is suspended from one end of a trigger 18, which trigger is pivotally attached to one end of the rocking bar 11, the inner end 19 of which is adapted to enter an opening 20 in a latch 21, the lower end of said latch being likewise pivotally secured to the bar, the opening being so located as to hold the trigger in a horizontal position when the end 19 is engaged therewith and by extending a cable 22 from the roller 16 to the upper end of the latch 21 and over a sheave 23 directly above the roller 16, the descent of said roller will swing the latch out of engagement with the trigger and permit the weight to descend and as the roller 16 is of sufficient weight to raise the weighted end of the rocking bar, the idler 9 will be lowered and the belt 6 loosened, whereby the belt and driving parts will stop rotating and remain stationary even though the driving pulley is still rotating.

In Fig. 1 of the drawings, the conveyer is shown in its operative position and with the weight suspended from the trigger, while in Fig. 2, the conveyer is shown as broken at 24, thereby causing that portion of the conveyer upon which the roller 16 is resting, to sag and as the roller descends, the trigger will be released and the weight dropped therefrom, whereupon the idler 9 will immediately descend.

The shaft 25 to which the sprockets 2 are attached has at one of its ends a sprocket 26, with which engages a chain 27, said chain also extending around a similar sprocket 28 on one end of the shaft 5, so that when said shaft 5 is driven through the medium of the belt wheel 4 the sprockets 2 and conveyer mounted thereon will be likewise driven.

This invention is especially designed to be used in connection with conveyers for removing saw dust from saw mills, but it will be clearly understood that it can be used in connection with any form of conveyer operated in the manner shown.

In some instances, the idler 9 is so positioned as to rest upon the belt 6 instead of being pulled into engagement therewith and when so arranged the trigger and latch are to be mounted on the beam 13 or in any other convenient position so that when the weight is released it will drop upon the free end of the rocking bar 11 and raise the idler out of engagement with the belt, such construction being clearly shown in Fig. 4 of the drawings.

What we claim is:

1. The combination with a conveyer, a driving means therefor, a belt coöperating with said driving means and an idler to hold said belt taut to operate the driving means and a weight to hold said idler in engagement with the belt; of means coöperating with the conveyer to release said weight and disengage the idler from the belt when parts of the conveyer sag.

2. The combination with a conveyer, means to operate said conveyer, a belt coöperating with said operating means, an idler adapted to hold said belt taut, a rocking bar connected to said idler, a trigger on said rocking bar, a weight adapted to be suspended from said trigger and means to release the trigger and permit the weight to descend when the conveyer is broken, whereby the idler will be released from the belt and the movement of the conveyer stopped.

3. The combination with a conveyer, a driving mechanism therefor, a belt coöperating with said driving mechanism and an idler to engage said belt; of a rocking bar connected to said idler, a trigger on said rocking bar, a weight adapted to be suspended from said trigger, a latch adapted to retain said trigger in position to support said weight, a roller resting on parts of said conveyer and a cable extending from the roller to said latch, whereby when the cable sags, the trigger will be released and the weight descend and the idler disengaged from the belt.

In testimony whereof we have signed our names to this specification in the presence of two subscribing witnesses.

CLAYTON T. ADCOX.
DANIEL A. HEADRICK.

Witnesses:
JNO. H. VOLZ,
THOMAS W. BRAMLETT.